(12) United States Patent
Kim et al.

(10) Patent No.: US 7,742,240 B2
(45) Date of Patent: Jun. 22, 2010

(54) SUBMINIATURE IMAGING OPTICAL SYSTEM

(75) Inventors: Jin Jong Kim, Gyunggi-do (KR); Young Gi Kim, Gyunggi-do (KR); Yong Joo Jo, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 112 days.

(21) Appl. No.: 12/074,063

(22) Filed: Feb. 29, 2008

(65) Prior Publication Data

US 2008/0225411 A1 Sep. 18, 2008

(30) Foreign Application Priority Data

Mar. 16, 2007 (KR) .................. 10-2007-0025981

(51) Int. Cl.
 *G02B 9/14* (2006.01)
 *G02B 3/02* (2006.01)
 *G02B 9/00* (2006.01)
(52) U.S. Cl. .................. 359/785; 359/716; 359/740
(58) Field of Classification Search .................. 359/708, 359/716, 738, 739, 740, 784, 785
See application file for complete search history.

(56) References Cited

U.S. PATENT DOCUMENTS

| 7,236,314 | B2 * | 6/2007 | Liao | 359/784 |
| 7,408,725 | B2 * | 8/2008 | Sato | 359/785 |
| 2006/0152824 | A1 | 7/2006 | Sun | |

FOREIGN PATENT DOCUMENTS

JP 2004-219982 8/2004

OTHER PUBLICATIONS

Korean Patent Office Action, mailed Feb. 28, 2008 and issued in corresponding Korean Patent Application No. 10-2007-0025981.

* cited by examiner

*Primary Examiner*—Jack Dinh (57) ABSTRACT

There is provided a subminiature imaging optical system utilizing only three sheets of lenses having positive, negative and positive refractive powers, respectively. The subminiature imaging optical system comprising, sequentially from an object side: a first lens having a meniscus shape with a convex object-side surface, the first lens having at least one aspherical surface and positive refractive power; a second lens having a meniscus shape with a convex image-side surface, the second lens having at least one spherical surface and negative refractive power; and a third lens having both surfaces formed of an aspherical surface and having positive refractive power.

7 Claims, 6 Drawing Sheets

SUBMINIATURE IMAGING OPTICAL SYSTEM

CROSS-REFERENCE TO RELATED APPLICATIONS

This application claims the priority of Korean Patent Application No. 2007-25981 filed on Mar. 16, 2007, in the Korean Intellectual Property Office, the disclosure of which is incorporated herein by reference.

BACKGROUND OF THE INVENTION

1. Field of the Invention

The present invention relates to a subminiature imaging optical system, and more particularly, to a subminiature imaging optical system installed in a mobile communication terminal and a personal digital assistant (PDA) or utilized in a surveillance camera and a digital camera.

2. Description of the Related Art

In general, mobile communication terminals had only functions of basic communication at their incipient stage. However, with increased use, the mobile communication terminals are required to have diversified functions ranging from photographing to image transmission and video communication, continuously evolving in their functions and services. Recently, a new expanded concept of mobile communication terminal by integrating digital camera technology with mobile phone technology, i.e., so called camera phones or camera mobile phones are significantly attracting attention.

In particular, the imaging optical system mounted on the camera phone is not only required to be miniaturized, lightweight and low-cost, but also have high resolution since the pixel size of an image sensor formed of a charge coupled device (CCD) or a complementary metal oxide semiconductor (CMOS) used in the imaging optical system is decreasing.

In order to satisfy miniaturization and low cost, the imaging optical system mounted on a small device such as a mobile phone needs to have lenses of as small a number as possible, but this restricts a degree of freedom in designing and undermines the optical capabilities.

Meanwhile, the imaging optical system may employ lenses formed of glass and plastic, respectively to achieve better optical capabilities and aberrational corrections. This construction may satisfy high pixel requirements, but degrades color definition due to increase in chromatic aberration. Besides, this renders the imaging optical system hardly miniaturizable enough to suit consumer's needs.

In addition, the conventional imaging optical system formed of lenses having positive, negative and positive refractive powers allows chromatic aberration and other aberrations to be corrected relatively easily but requires highly precise machining owing to the lenses formed of all aspherical surfaces.

SUMMARY OF THE INVENTION

An aspect of the present invention provides a subminiature imaging optical system capable of effectively correcting chromatic aberration of lenses to prevent degradation of color definition.

An aspect of the present invention also provides a subminiature imaging optical system in which lenses have minimum aspherical surfaces to require less precise machining, and each of the lenses has power adequately adjusted to enhance image quality.

According to an aspect of the present invention, there is provided a subminiature imaging optical system including, sequentially from an object side: a first lens having a meniscus shape with a convex object-side surface, the first lens having at least one apherical surface and positive refractive power; a second lens having a meniscus shape with a convex image-side surface, the second lens having at least one spherical surface and negative refractive power; and a third lens having both surfaces formed of an aspherical surface and having positive refractive power, wherein the first lens satisfies following condition 1 and the third lens satisfies following conditions 2 and 3:

$$0.4 < f1/f < 0.8 \qquad \text{condition 1,}$$

$$1.4 < T\text{max}/T\text{min} < 3.0 \qquad \text{condition 2,}$$

$$1.5 < f3/f < 5.0 \qquad \text{condition 3,}$$

where f is an effective focal length of the optical system, f1 is a focal length of the first lens, Tmax is a maximum thickness of the third lens within an effective aperture, Tmin is a minimum thickness of the third lens within an effective aperture and f3 is a focal length of the third lens.

The second lens may have an aspherical surface satisfying even-order and odd-order aspherical coefficients.

The second lens may have refractive index relatively higher than refractive indexes of the first and third lenses.

The first lens may be formed of glass and the second and third lenses may be formed of plastic.

The second lens may be formed of glass and the first and third lenses may be formed of plastic.

The first, second and third lenses may be formed of plastic.

The subminiature imaging optical system may further include an aperture stop disposed between the first and second lenses to remove an unnecessary portion of light incident on the first lens.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
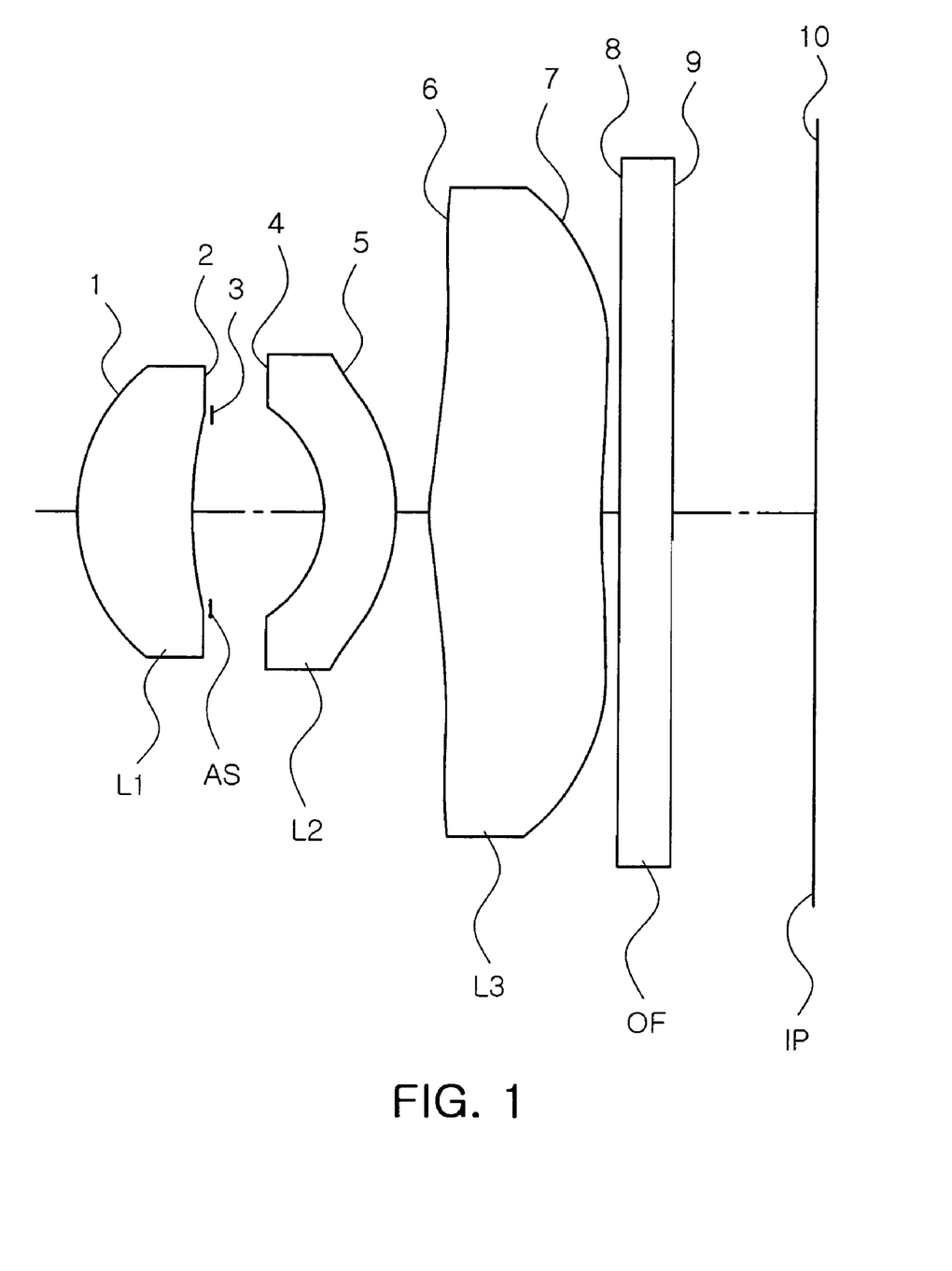
FIG. 1 is a lens configuration view illustrating a subminiature imaging optical system according to a first embodiment of the invention.

FIG. 1 is a lens configuration view illustrating a subminiature imaging optical system according to a first embodiment of the invention. In the following lens configuration views, the thicknesses, sizes and shapes of the lenses may be exaggerated for clarity. In particular, the shapes of spherical or aspherical surfaces shown in the views are only exemplary and should not be construed as limiting.

As shown in FIG. 1, the subminiature imaging optical system includes, sequentially from an object side, first, second and third lenses L1, L2, and L3. The first lens L1 has a meniscus shape with a convex object-side surface. The first lens L1 is made of glass or plastic and has positive refractive power. The second lens L2 has a meniscus shape with a convex image-side surface. The second lens L2 is made of glass or plastic and has negative refractive power. The third lens L3 is made of plastic and has positive refractive power. An aperture stop AS is disposed between the first and second lenses L1 and L2 to adjust an amount of light passed through the first lens.

Here, the first and second lenses L1 and L2 formed of glass are less sensitive to temperature change. The first, second, and third lenses L1, L2, and L3 made of plastic have aspherical surfaces easily formed thereon.

Meanwhile, an optical filter OF such as an infrared ray filter, a cover glass and the like is provided between the third lens L3 and an image plane IP.

In the subminiature imaging optical system of the present embodiment, the second lens L2 has higher refractive power and the first and second lenses L1 and L2 oppose each other in a meniscus shape, thereby allowing the optical system to be subminiaturized. The second and third lenses L2 and L3 have refractive surfaces formed of an aspherical surface thereby to correct aberrations and attain superior optical capabilities.

That is, the first lens L1 having positive refractive power and the second lens L2 having negative refractive power enable chromatic aberration to be corrected and high resolution to be attained. Particularly, the first lens L1 and third lens L3 adopting aspherical lenses increase resolution, while reducing various aberrations such as spherical aberration. This produces a compact optical system superior in optical characteristics.

The first lens L1, the second lens L2 and the third lens L3 are partially or entirely formed of an easily-machinable plastic material. This reduces weight, enhances machinability and saves manufacturing costs of the optical system. Accordingly, the high-resolution subminiature imaging optical system can be produced only with the three sheets of lenses.

Moreover, the first, second and third lenses L1, L2 and L3 have positive, negative and positive refractive power, respectively and the lenses are formed in a meniscus shape or have aspherical surfaces formed thereon adequately. This reduces an incident angle of light at edges of the lenses, allows light to be distributed uniformly to both a central portion and peripheral portions of the image sensor and ensures a peripheral light amount as much as possible. This as a result prevents vignetting and distortion.

Furthermore, the second lens L2 has at least one aspherical surface and another surface satisfying even-order and odd-order aspherical coefficients.

Here, at least one of the three lenses has at least one spherical surface to assure steady image quality and reduce manufacturing errors, thereby producing a highly-reliable optical system.

With this overall configuration, operational effects of following conditions 1 and 2 will be examined hereunder.

$$0.4 < f1/f < 0.8 \qquad \text{condition 1,}$$

where f1 is a focal length of the first lens L1, and f is an effective focal length of the overall optical system.

Condition 1 governs a ratio between a focal length of the first lens L1 and an overall focal length. That is, condition 1 prescribes refractive power of the first lens L1. f1 greater than an upper limit of condition 1 decreases refractive power of the first lens L1 to hinder miniaturization of the optical system, and inevitably increases refractive powers of the second and third lenses L2 and L3 formed of a single lens to deteriorate chromatic aberration. Contrariwise, f1 smaller than a lower limit excessively increases refractive power of the first lens L1, thereby deteriorating spherical aberration and coma. This renders high resolution hardly attainable, and decreases radius of curvature of surfaces of the first lens L1, posing a difficulty to machininability.

$$1.4 < T\max/T\min < 3.0 \qquad \text{condition 2,}$$

where Tmax is a maximum thickness of the third lens L3 within an effective aperture and Tmin is a minimum thickness of the third lens L3 within an effective aperture.

Condition 2 governs a thickness of the third lens. Deviation from a lower limit of condition 2 renders aberrations not easily correctable while increasing an incident angle of light on the image plane. Contrariwise, deviation from an upper limit of condition 2 increases a difference between the minimum and maximum thickness of the third lens, potentially causing the lenses to be deformed when molded or machined.

$$1.5 < f3/f < 5.0 \qquad \text{condition}$$

where f3 is a focal length of the third lens L3 and f is an effective focal length of the overall optical system.

Condition 3 governs a ratio between a focal length of the third lens L3 and an overall focal length. That is, condition 3 prescribes refractive power of the third lens L3. Deviation from a lower limit of condition 3 increases refractive power of the third lens L3, thus making it hard to correct distortion. On the other hand, deviation from an upper limit of condition 3 decreases refractive power of the third lens L3, thus hardly ensuring subminiaturization of the optical system.

Now, the present invention will be examined in greater detail through specific numerical examples.

As described above, in the following first to third embodiments, the subminiature imaging optical system of the present invention includes, sequentially from an object side, a first lens L1, a second lens L2, and a third lens L3. The first lens L1 has a meniscus shape with a convex object-side surface. The first lens L1 is made of glass and has positive refractivity. The second lens L2 has a meniscus shape with a convex image-side surface. The second lens L2 is made of plastic and has negative refractive power. The third lens L3 is made of plastic and has positive refractive power. An aperture stop (AS) is disposed between the first lens L1 and the second lens L2.

Also, an optical filter OF such as an infrared ray filter, a cover glass and the like may be provided between the fourth lens L3 and an image plane IP.

In the embodiments below, the first lens L1 is formed of glass and thus less sensitive to temperature change, and the second lens L2 and third lens L3 are formed of plastic and thus have aspherical surfaces easily formed thereon.

Moreover, in the embodiments below, the optical system has an F number of approximately 2.8, an angle of view of 60 degrees, and a total length of 5 mm or less, and suitably applicable to a 2-megapixel charge coupled device (CCD) or complementary metal oxide semiconductor (CMOS). But the optical system may be appropriately varied in total length, number of pixels and kind of an imaging device applied, without departing from the scope of the invention.

Meanwhile, aspherical coefficients used in each of the embodiments herein are obtained from following Equation 1, and "E and a number following the E" used in a conic constant K and aspherical coefficients AR1, AR2, AR3, . . . ARn represent a 10's power. For example, E+01 and E−02 represent $10^1$ and $10^{-2}$ respectively.

$$Z = \frac{Cr^2}{1+SQRT[1-(1+k)c^2r^2]} + AR1r + AR2r^2 + AR3r^3 + \ldots + ARnr^n,$$

Equation 1 where Z is a distance from a vertex of a lens in an optical axis, r is a distance in a direction perpendicular to the optical axis, C is a reciprocal number of a radius R of curvature at the vertex of the lens, K is a conic constant and AR1, AR2, AR3, . . . ARn are aspherical coefficients.

First Embodiment

Table 1 below shows numerical values according to a first embodiment of the present invention.

FIG. 1 is a view illustrating a lens arrangement of the subminiature imaging optical system according to the first embodiment of the present invention, and FIGS. 2A to 2C show aberrations of the embodiment shown in Table 1 and FIG. 1. FIG. 3 is a graph illustrating MTF characteristics shown in FIG. 1.

Here, the MTF depends on a spatial frequency of a cycle per millimeter and is defined by the following Equation 2 between a maximum intensity (Max) and a minimum intensity (Min) of light.

$$MTF = (Max-Min)/(Max+Min)$$

Equation 2

That is, MTF is most ideal when 1 and a smaller MTF deteriorates resolution.

In the first embodiment, an F number Fno is 2.8, an angle of view is 65.0 degrees, a total length from the object-side surface 1 of the first lens L1 to the image plane IP is 4.2 mm, and an effective focal length f is 3.56 mm. Also, a focal length f1 of the first lens L1 is 2.84 mm, a focal length of the second lens L2 is −4.13 mm, a focal length f3 of the third lens L3 is 5.94 mm, a maximum thickness Tmax of the third lens L3 within an effective aperture is 0.97 mm, and a minimum thickness Tmin of the third lens L3 within an effective aperture is 0.339 mm.

TABLE 1

| Surface No. | Radius of curvature R | Thickness or distance t | Refractive index Nd | Abbe number Vd | Remark |
|---|---|---|---|---|---|
| 1 | 1.08 | 0.65 | 1.54 | 56.3 | First lens |
| 2 | 2.8 | 0.1 | | | |
| 3 | ∞ | 0.63 | | | Aperture stop |
| 4 | −0.75 | 0.41 | 1.613 | 23.6 | Second lens |
| 5 | −1.28 | 0.19 | | | |
| 6 | 2.03 | 0.97 | 1.545 | 56.3 | Third lens |
| 7 | 4.56 | 0.1 | | | |
| 8 | ∞ | 0.3 | 1.517 | 64.2 | Optical filter |
| 9 | ∞ | 0.85 | | | |
| 10 | ∞ | — | | | Image plane |

In Table 1, according to the first embodiment, the object-side surface 1 and image-side surface 2 of the first lens L1 formed of glass, the object-side surface 4 and image-side surface 5 of the second lens L2 formed of plastic and the object-side surface 6 and the image-side surface 7 of the third lens L3 formed of plastic are aspherical.

Values of aspherical coefficients in the first embodiment according to Equation 1 are noted in Table 2 below.

TABLE 2

| | Surface No. | | | | |
|---|---|---|---|---|---|
| | 1 | 2 | 5 | 6 | 7 |
| K | 4.7900E−02 | −1.3220E−01 | 6.8000E−01 | −3.1553E+01 | −1.0522E+01 |
| $AR_3$ | | | −4.8720E−02 | | |
| $AR_4$ | 3.9730E−03 | 2.1840E−02 | −1.9420E−01 | −5.4880E−02 | −8.2010E−02 |
| $AR_5$ | | | 1.2790E−01 | | |
| $AR_6$ | 1.8130E−02 | 1.7540E−01 | 3.7390E−01 | 2.1180E−02 | 1.4000E−02 |
| $AR_8$ | −2.5820E+00 | −7.3720E−01 | −5.0090E−01 | −4.2540E−03 | 2.7740E−03 |
| $AR_{10}$ | | 8.2470E−01 | 5.2030E−01 | 6.1720E−04 | 8.5400E−06 |
| $AR_{12}$ | | | | −5.3990E−05 | 3.6590E−05 |

Second Embodiment

Figure 4:
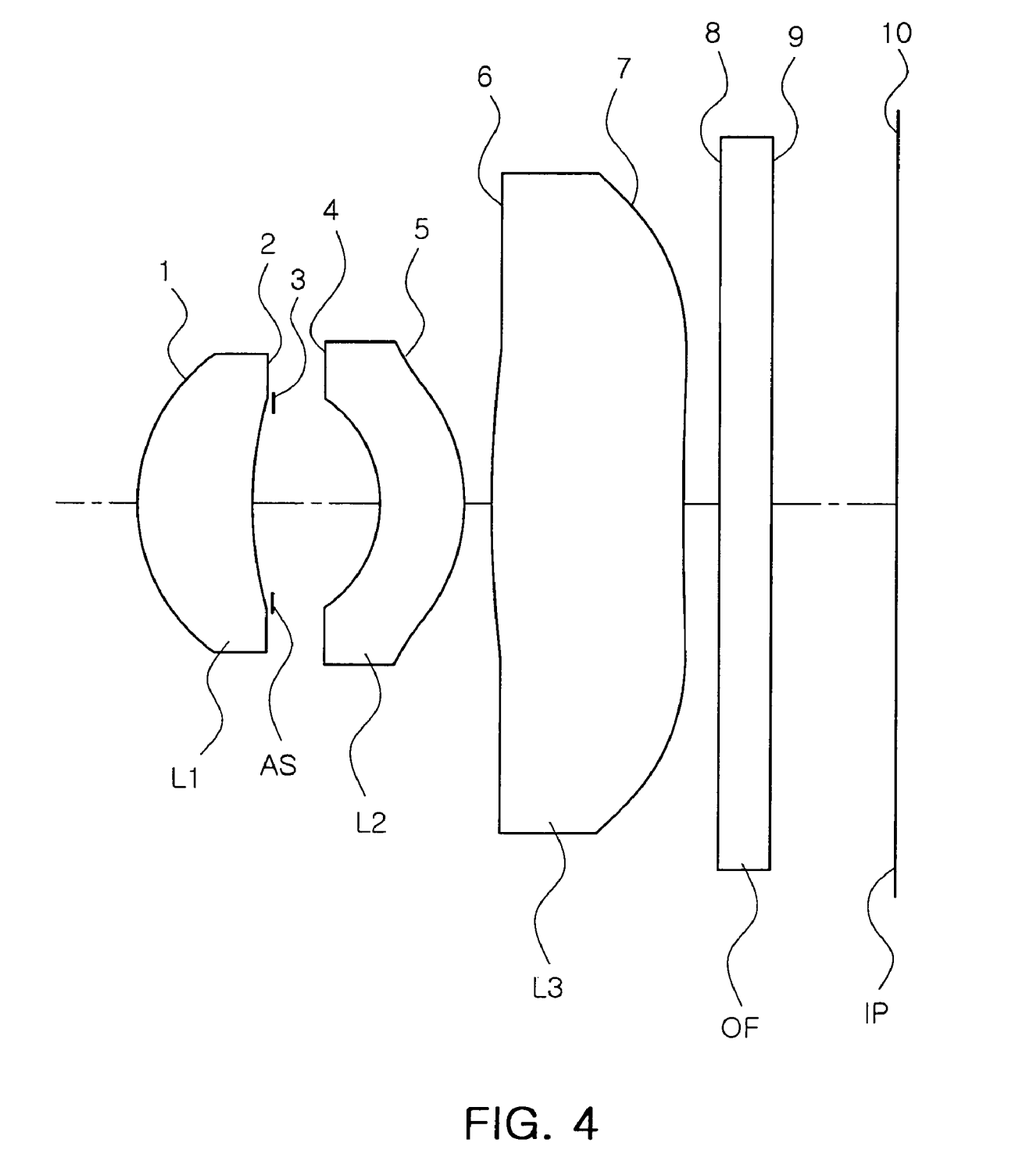
FIG. 4 is a lens configuration view illustrating a subminiature imaging optical system according to a second embodiment of the invention.

Table 3 below shows numerical values according to a second embodiment of the present invention. FIG. 4 is a view illustrating a lens arrangement of the subminiature imaging optical system according to the second embodiment of the present invention, and FIGS. 5A to 5C show aberrations of the embodiment shown in Table 3 and FIG. 4. FIG. 6 is a graph illustrating MTF characteristics of the embodiment shown in FIG. 4.

In the second embodiment, an F number Fno is 2.7, an angle of view is 65.0 degrees, a total length TL from the object-side surface 1 of the first lens L1 to the image plane IP is 4.30 mm, and an effective focal length f is 3.53 mm. Also, a focal length f1 of the first lens L1 is 2.80 mm, a focal length of the second lens L2 is −8.26 mm, a focal length f3 of the third lens L3 is 14.30 mm, a maximum thickness Tmax of the third lens L3 within an effective aperture is 3.99 mm, and a minimum thickness Tmin of the third lens L3 within an effective aperture is 1.07 mm.

TABLE 3

| Surface No. | Radius of curvature R | Thickness or distance t | Refractive index Nd | Abbe number Vd | Remark |
|---|---|---|---|---|---|
| 1 | 1.07 | 0.65 | 1.545 | 56.3 | First lens |
| 2 | 2.82 | 0.1 | | | |
| 3 | ∞ | 0.6 | | | Aperture stop |
| 4 | −0.75 | 0.47 | 1.613 | 23.6 | Second lens |
| 5 | −1.09 | 0.16 | | | |
| 6 | 3.64 | 1.07 | 1.545 | 56.3 | Third lens |
| 7 | 6.11 | 0.2 | | | |
| 8 | ∞ | 0.3 | 1.517 | 64.2 | Optical filter |
| 9 | ∞ | 0.75000 | | | |
| 10 | ∞ | — | | | Image plane |

In Table 3, according to the second embodiment, the object-side surface 1 and image-side surface 2 of the first lens L1 formed of glass, the object-side surface 4 and image-side surface 5 of the second lens L2 formed of plastic and the object-side surface 6 and the image-side surface 7 of the third lens L3 formed of plastic are aspherical.

Values of aspherical coefficients in the second embodiment according to Equation 1 are noted in Table 4 below.

TABLE 4

| | Surface No. | | | | |
|---|---|---|---|---|---|
| | 1 | 2 | 5 | 6 | 7 |
| K | −5.3700E−02 | — | 8.6400E−02 | −7.5227E+01 | −8.5398E+00 |
| $AR_4$ | 1.6640E−02 | 2.7940E−02 | −7.1050E−02 | −4.3590E−02 | −7.6970E−02 |
| $AR_6$ | 2.5650E−02 | 5.5670E−02 | 2.8360E−01 | 1.8460E−02 | 1.1690E−02 |
| $AR_8$ | −1.6030E−02 | −1.9520E−01 | −2.2960E−01 | −3.5980E−03 | −2.5790E−03 |
| $AR_{10}$ | — | — | 3.1120E−01 | 4.1060E−04 | 1.3690E−04 |
| $AR_{12}$ | — | | | −2.5820E−05 | 1.0940E−05 |

In the meantime, values of conditions 1 to 3 for the above first and second embodiments are noted in Table 5.

TABLE 5

| | First embodiment | Second embodiment |
|---|---|---|
| Condition 1(f1/f) | 0.795 | 0.790 |
| Condition 2(Tmax/Tmin) | 2.862 | 2.657 |
| Condition 3(f3/f) | 1.669 | 4.053 |

Figure 2:
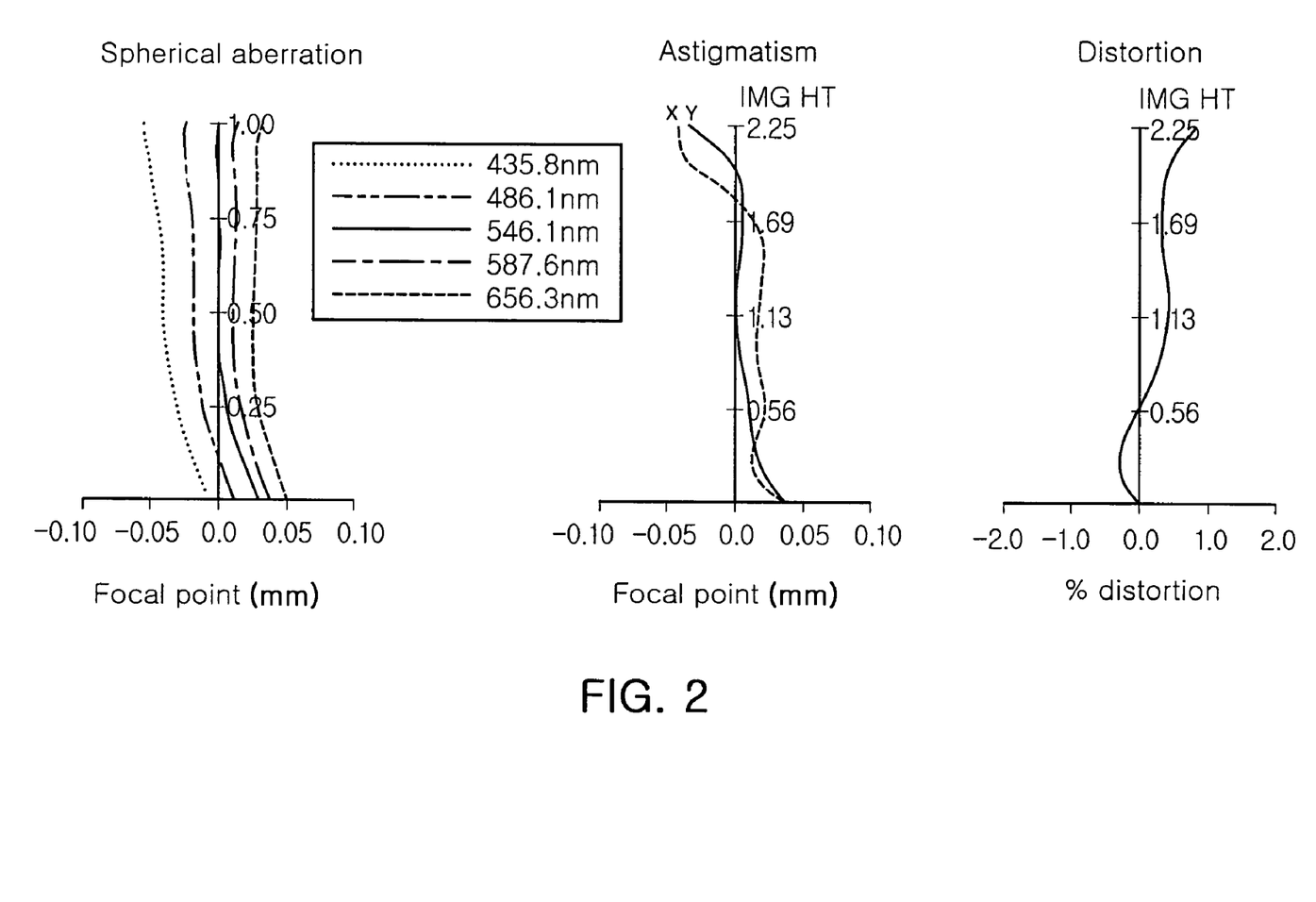
FIG. 2 is an aberrational diagram illustrating the embodiment shown in FIG. 2, in which A represents spherical aberration, B represents astigmatism and C represents distortion.
Figure 3:
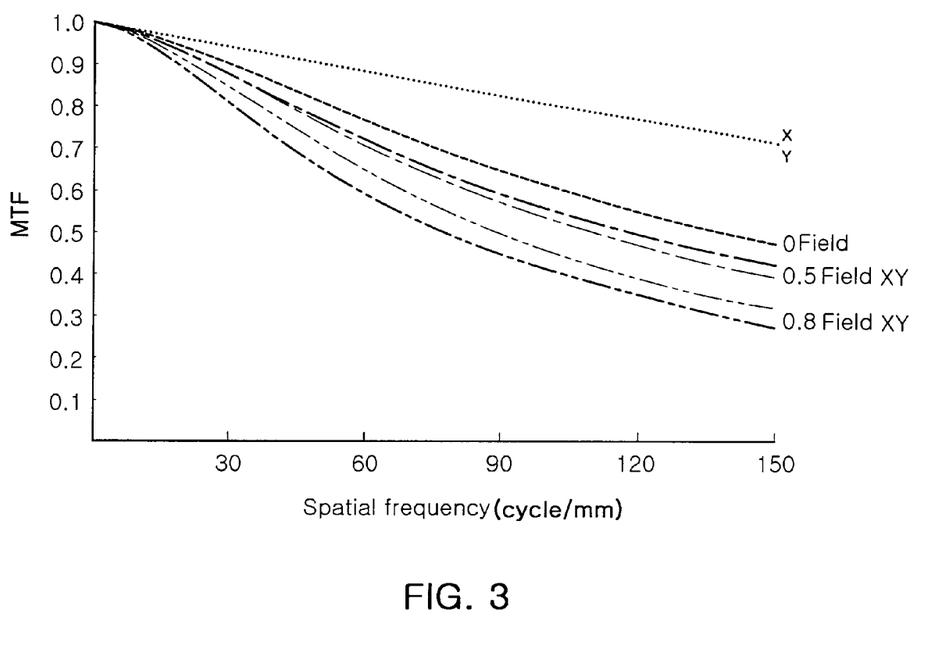
FIG. 3 is a graph illustrating modulation transfer function (MTF) characteristics of the embodiment shown in FIG. 1.
Figure 5:
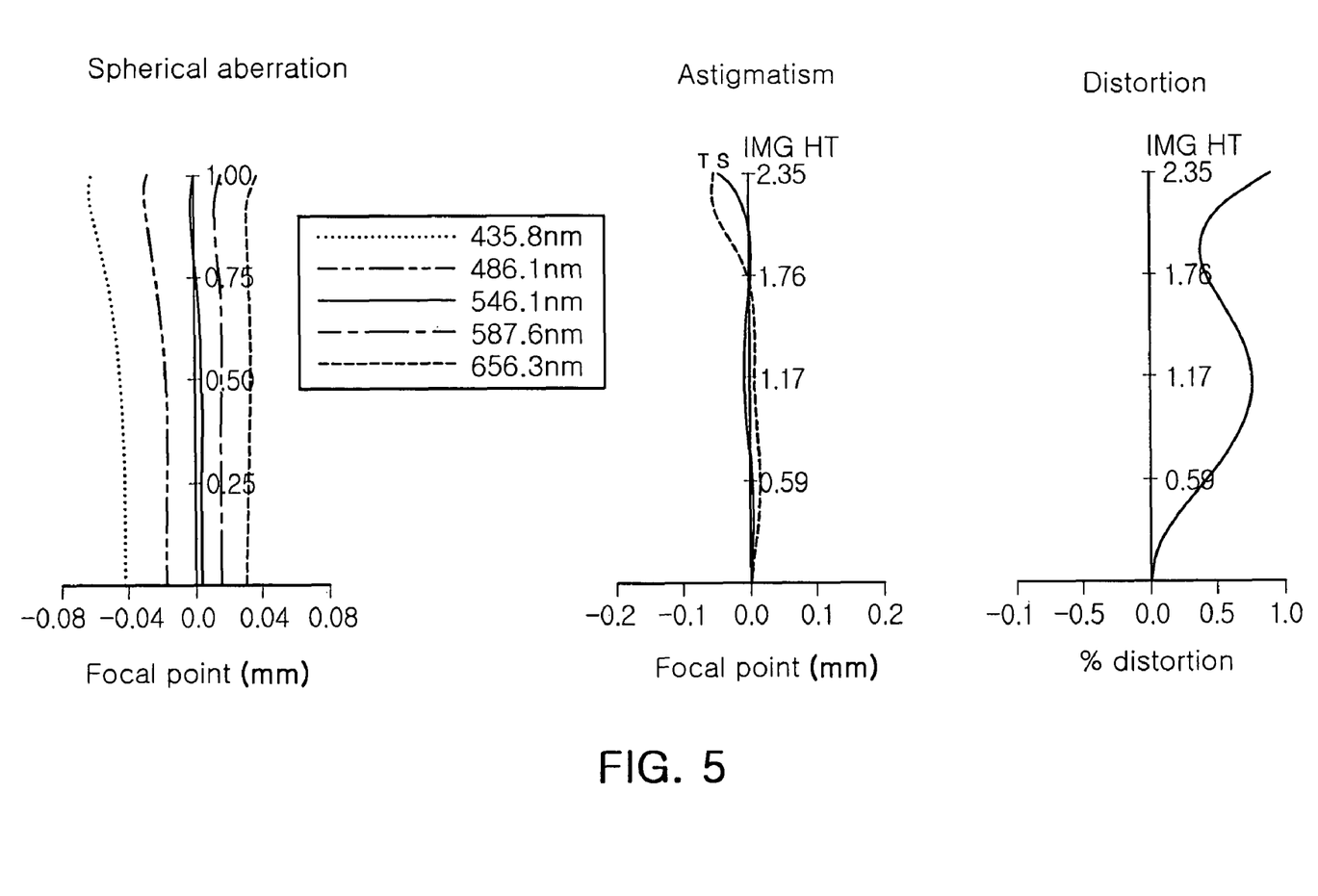
FIG. 5 is an aberrational diagram illustrating the embodiment shown in FIG. 5, in which A represents spherical aberration, B represents astigmatism and C represents distortion.
Figure 6:
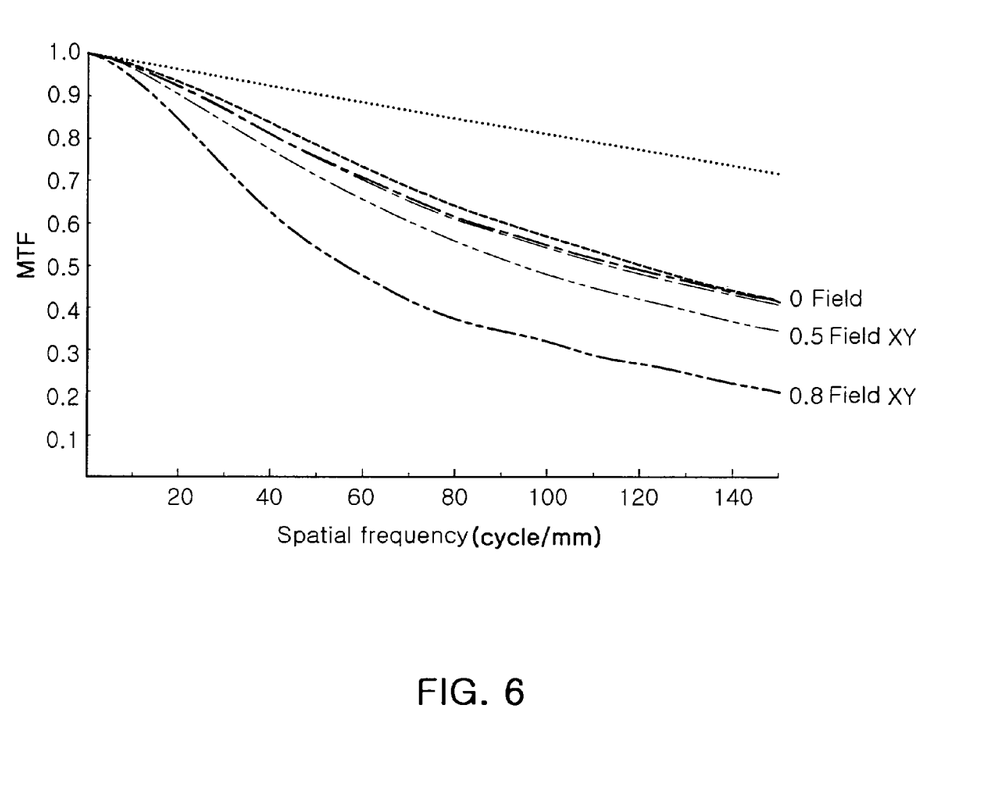
FIG. 6 is a graph illustrating modulation transfer function (MTF) characteristics of the embodiment shown in FIG. 3.

As shown in FIGS. 2 and 5, the first and second embodiments of the present invention produce the subminiature imaging optical system superior in aberrational characteristics. Also, as shown in FIGS. 3 and 6, the subminiature imaging optical system with excellent MTF characteristics and high resolution can be obtained.

As set forth above, according to exemplary embodiments of the invention, the imaging optical system employs only three sheets of lenses to attain high resolution adequate for a high-pixel sensor. Also, the subminiature imaging optical system can be compact and extremely reduced in total length due to the small number of lenses.

Moreover, the three lenses have a minimum number of aspherical surfaces to require less precise machinability and each of the lenses is suitably adjusted in power to enhance resolution. Also, the lenses are configured to have spherical surfaces so as to be machined with fewer errors, thereby producing a highly-reliable optical system.

Furthermore, at least two lenses are formed of plastic to easily manufacture a lighter and lower-cost subminiature imaging optical system in mass production.

In addition, the first or second lens is formed of a low-dispersion glass material to effectively correct chromatic aberration and minimize a positional shift of an image resulting from temperature change.

While the present invention has been shown and described in connection with the exemplary embodiments, it will be apparent to those skilled in the art that modifications and variations can be made without departing from the spirit and scope of the invention as defined by the appended claims.

What is claimed is:

1. A subminiature imaging optical system comprising, sequentially from an object side:

a first lens having a meniscus shape with a convex object-side surface, the first lens having at least one aspherical surface and positive refractive power;

a second lens having a meniscus shape with a convex image-side surface, the second lens having a spherical surface and negative refractive power; and a third lens having both surfaces formed of an aspherical surface and having positive refractive power, wherein the first lens satisfies following condition 1 and the third lens satisfies following conditions 2 and 3:

$0.4 < f1/f < 0.8$                        condition 1, $1.4 < Tmax/Tmin < 3.0$           condition 2, $1.5 < f3/f < 5.0$                         condition 3, where f is an effective focal length of the optical system, f1 is a focal length of the first lens, Tmax is a maximum thickness of the third lens within an effective aperture, Tmin is a minimum thickness of the third lens within an effective aperture and f3 is a focal length of the third lens.

2. The subminiature imaging optical system of claim 1, wherein the second lens further has an aspherical surface.

3. The subminiature imaging optical system of claim 1, wherein the second lens has refractive index relatively higher than refractive indexes of the first and third lenses.

4. The subminiature imaging optical system of claim 1, wherein the first lens is formed of glass and the second and third lenses are formed of plastic.

5. The subminiature imaging optical system of claim 1, wherein the second lens is formed of glass and the first and third lenses are formed of plastic.

6. The subminiature imaging optical system of claim 1, wherein the first, second and third lenses are formed of plastic.

7. The subminiature imaging optical system of claim 1, further comprising an aperture stop disposed between the first and second lenses to remove an unnecessary portion of light incident on the first lens.

* * * * *